United States Patent
De Paepe et al.

(10) Patent No.: US 12,282,581 B2
(45) Date of Patent: Apr. 22, 2025

(54) SYSTEMS AND METHODS FOR GENERATING SYNTHETIC DATA

(71) Applicant: Collibra Belgium BV, Brussels (BE)

(72) Inventors: Gretel De Paepe, Watermaal-Bosvoorde (BE); Vicky Froyen, Kessel-Lo (BE); Kelsey Schuster, St. Louis, MO (US); Michael Tandecki, Vilvoorde (BE); Anna Filipiak, Ostrow Wielkopolski (PL)

(73) Assignee: Collibra Belgium BV, Brussels (BE)

( * ) Notice: Subject to any disclaimer, the term of this patent is extended or adjusted under 35 U.S.C. 154(b) by 580 days.

(21) Appl. No.: 17/721,963

(22) Filed: Apr. 15, 2022

(65) Prior Publication Data

US 2023/0334169 A1   Oct. 19, 2023

(51) Int. Cl.
*G06F 21/62* (2013.01)
*G06F 16/22* (2019.01)

(52) U.S. Cl.
CPC ...... *G06F 21/6245* (2013.01); *G06F 16/2282* (2019.01)

(58) Field of Classification Search
CPC .......................... G06F 21/6245; G06F 16/2282
USPC .......................................................... 726/30
See application file for complete search history.

(56) References Cited

U.S. PATENT DOCUMENTS

| | | | |
|---|---|---|---|
| 10,713,384 B2 * | 7/2020 | Veeramachaneni | G06F 16/00 |
| 11,574,186 B2 * | 2/2023 | Iyoob | G06N 3/044 |
| 11,675,817 B1 * | 6/2023 | Pratik | G06N 3/047 |
| | | | 707/740 |
| 11,836,122 B2 * | 12/2023 | Lott | G06N 20/00 |
| 2018/0165475 A1 | 6/2018 | Veeramachaneni et al. | |
| 2020/0012890 A1 * | 1/2020 | Watson | G06F 11/3628 |
| 2020/0012933 A1 * | 1/2020 | Truong | G06V 10/768 |
| 2021/0097201 A1 * | 4/2021 | Wasicek | G06F 21/32 |
| 2021/0133557 A1 | 5/2021 | Iyoob et al. | |
| 2021/0374128 A1 * | 12/2021 | El Emam | G06F 16/2379 |
| 2023/0244987 A1 * | 8/2023 | Truong | G06N 20/00 |
| | | | 706/11 |

OTHER PUBLICATIONS

PCT/EP2023/059805, International Search Report and Written Opinion, Applicant: Collibra Belguim BV, mailed Jun. 30, 2023, 14 pgs.

* cited by examiner

*Primary Examiner* — Dereena T Cattungal
(74) *Attorney, Agent, or Firm* — Perkins Coie LLP

(57) ABSTRACT

The present disclosure is directed to systems and methods for generating synthetic data. Entities maintain large amounts of data, and conducting probability distribution and/or correlation analyses on these large datasets while maintaining data privacy for personally identifiable information (PII) is difficult. The present application describes methods for identifying data fields that comprise PII and synthesizing the data so that the PII is removed, but the integrity of the probability distribution and/or correlation metrics remains. Certain data is grouped into data fields based on a data table type, and each data type may be assigned a certain data analysis strategy, which may comprise a joint probability distribution, a characterbase data faker, a genetic regex generator, and/or a timeseries model. A table sketch may be generated that may comprise at least one synthesizer recipe to be used in future data queries.

20 Claims, 6 Drawing Sheets

SYSTEMS AND METHODS FOR GENERATING SYNTHETIC DATA

CROSS-REFERENCE TO RELATED APPLICATION(S)

Patent application Ser. No. 16/776,293 titled "SYSTEMS AND METHOD OF CONTEXTUAL DATA MASKING FOR PRIVATE AND SECURE DATA LINKAGE"; patent application Ser. No. 17/103,751, titled "SYSTEMS AND METHODS FOR UNIVERSAL REFERENCE SOURCE CREATION AND ACCURATE SECURE MATCHING"; patent application Ser. No. 17/103,720, titled "SYSTEMS AND METHODS FOR DATA ENRICHMENT"; and patent application Ser. No. 17/219,340, titled "SYSTEMS AND METHODS FOR AN ON-DEMAND, SECURE, AND PREDICTIVE VALUE-ADDED DATA MARKETPLACE" are hereby incorporated by reference in their entirety.

TECHNICAL FIELD

The present disclosure relates to generating synthetic data, calculating probability distributions in datasets, and calculating probability correlations in datasets.

BACKGROUND

Entities maintain large amounts of data. Analyzing such large amounts data typically involves analyzing a probability distribution and/or a probability correlation. A probability distribution is a measure on the same set of data on which a function operates. A probability correlation measures the correlation of values in a stochastic process at different times, which relies on the expectation and variance of a stochastic process. Generally, correlation or dependence is any statistical relationship, whether causal or not, between two random variables or bivariate data.

Current models for analyzing large sets of data may be proficient at creating accurate probability distributions, but such current models lack in creating quality correlation models. Additionally, when creating probability distributions and probability correlations in a large dataset, current models fail to ensure that personally identifiable information (PII) is protected. As such, there is an increased need for systems and methods that can address the challenges of modern-day data analysis regarding the creation of probability distributions and correlations, while simultaneously maintaining the privacy of certain PII included in the dataset.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
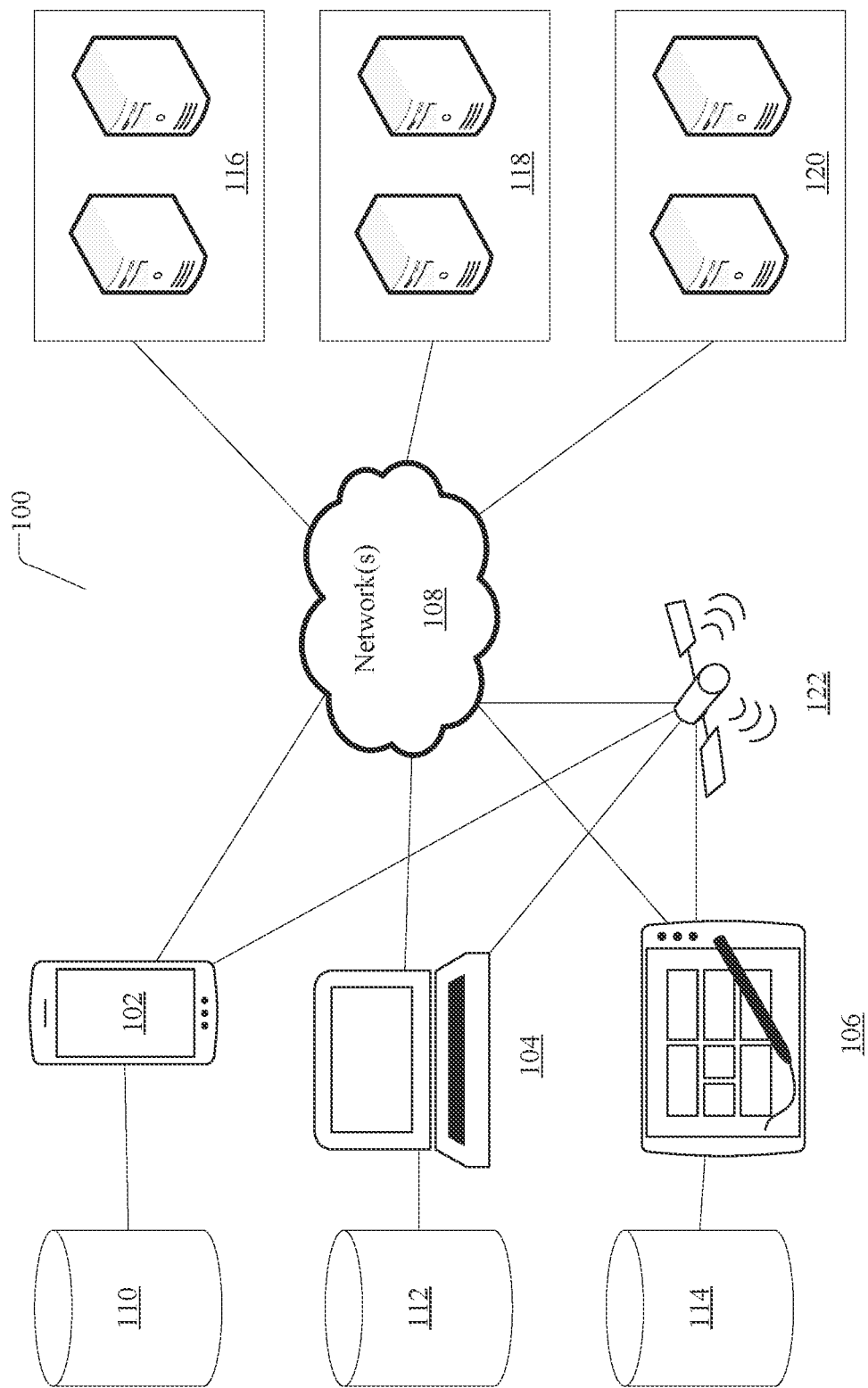
FIG. 1 illustrates an example of a distributed system for generating synthetic data, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to improving data correlation while maintaining privacy of data by generating synthetic data. Previous solutions have incorporated machine-learning (ML) models such as generative adversarial networks, among others, to generate accurate probability distribution outputs in large sets of data. However, these models have come up short in generating accurate data correlation outputs. By using statistics and a joint probability distribution to model the relationship between certain fields of data, the present application discloses systems and methods for improving the accuracy of probability correlation among data fields.

For example, in one embodiment, a data file may contain the data identifier "birth-year" of a person and a field showing whether the person is dead as "1" (yes) or "2" (no). There is a known correlation between the two values, birth_year and whether a person is dead. The further in the past the birth year is, the higher the likelihood that the person is deceased. When generating synthetic data, many current solutions actually lose this correlation (e.g., the longer ago the birth year the less likely the dead value is "1" or no correlation at all between the two values). In the present application, joint probability distribution is applied, calculating how likely "1" (dead—yes) is for each birth_year bucket. Specifically, in one example, if the dead True probability is 0.90 for people with birth_year between 1930 and 1940, then the synthetic data that will be generated will use this probability during the generation process, ensuring that the synthetic data shows people born between these two dates with a dead True probability of approximately 0.90.

In one example embodiment, the system may receive data input in the form of a dataset (e.g., a data table, data file, spreadsheet, etc.). The system may analyze the data input and intelligently select a particular data synthesizing strategies to apply to the dataset in order to generate fake data in which PII data is protected while maintaining both distributions within fields as well as correlations between fields. One example of a strategy may include identifying that certain zip codes are correlated with higher salaries and aims to maintain that correlation in the synthetic data generated. Another challenge in creating synthetic data is that some data is oftentimes considered PII, and, as such, inaccessible to the broader data science community.

To solve this issue, the systems and methods described herein may identify certain data fields as PII and generate synthetic data while maintaining accurate probability distributions and correlations. For example, the system described herein can use the data classification engine to identify PII and use one of the strategies to "fake" such data. One specific example would be to apply a regex matcher that may generate fake social security numbers in order to protect the underlying, actual PII.

In one instance, the data that is received by the system may be analyzed via a data classification engine (see U.S. Pat. No. 11,138,477, which is incorporated herein in its entirety), where PII is identified by data field. Based on the analyzed correlation and distribution metrics, certain recipes may be selected to synthesize the PII so that privacy is maintained, but also the distribution and correlation according to the original dataset is maintained.

In yet another example aspect, certain data fields may be detected as dependent on other data fields for computation and may be computed based on PII or non-PII data fields. The system may implement an auto-detection engine that detects computed fields and extracts the computation algorithm, so that when synthetic data is generated, the synthesis of the data can still maintain the accuracy of the underlying computation dependency.

Another example aspect of the present disclosure is the ability to store recipes in a table sketch and therefore use the recipes as a proxy to query the data quickly. Rather than being forced to run an entire process each time to generate synthetic data from the same real data set, a recipe can be stored on the first initiation of the process and can then be subsequently used to create subsequent synthetic data sets more efficiently. Another benefit of this architecture is that the recipes can act as a proxy of the data and can be queried directly rather than the actual underlying data. Querying the recipes also protects against potential exposure of PII. A "Table Sketch" is a sum of recipes, i.e., a sum of the synthetic data strategies and auto-detection of computed fields methods that result in recipes.

Rather than accessing billions of data points in a dataset, the systems and methods herein disclose obtaining data-driven answers to certain questions by only querying a smaller synthesized sample of the larger dataset. For example, a user may query what the average wage of a male person in New York is. Rather than accessing all wage input values for males in New York, the system may generate an output based on a random, yet statistically significant, synthesized sampling of the larger dataset to provide to the user. Since the table sketch created for the larger dataset contains the recipe generated by the Joint Probability recipe, the smaller synthetic dataset will have the same distribution of wages as the original larger dataset and as well as the same correlation between the fields City, Gender, and Wages.

Accordingly, the present disclosure provides a plurality of technical benefits including but not limited to: enabling more efficient use of electronic resources for data correlation and distribution, protecting privacy of PII by enabling data synthesis while also maintaining accuracy of probability distribution and correlation values; and decreasing data query usage by implementing data sketches for certain queries by reducing data table lookup volume. Creating synthetic data protects PII and maintains distributions within certain fields, as well as maintains accuracy of computed fields. Further, the storage of recipes to generate synthetic data improves efficiency with generating subsequent synthetic datasets, as well as allows for certain queries to be executed on the recipe (where the recipe is acting as a proxy), rather than the underlying data itself. This again increases efficiency in data analysis and protects PII from privacy breaches.

FIG. 1 illustrates an example of a distributed system for generating synthetic data, as described herein. Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download certain data distribution/correlation recipes, as well as data synthesis recipes, via network(s) 108 that may be applied to the client-specific data. The client-specific data may be stored in local databases 110, 112, and 114. If the client-specific data contains PII, then the PII may be analyzed by the system and synthesized. Once analyzed and synthesized, the client-specific data may be transmitted and further analyzed via network(s) 108 and/or satellite 122 to server(s) 116, 118, and/or 120. Server(s) 116, 118, and/or 120 may be third-party servers accessing the synthesized data. In other examples, client-specific data may be stored in servers (in addition to or instead of local client devices and local databases) and may be synthesized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific synthesized data or unsynthesized data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

In some examples, the client devices 102, 104, and/or 106 may be configured to run probability distribution and/or correlation software on certain datasets. Client devices 102, 104, and/or 106 may also be configured to run data synthesis on certain identified data fields. Specifically, the client device(s) 102, 104, and/or 106 may be configured to run a data synthesizer, a computed fields synthesizer, and a query sketch module. The data synthesizer may identify which data fields contain PII and synthesize the data so that the PII is removed but the overall distribution/correlation remains the same. The client-specific data may first be received by client devices 102, 104, and/or 106, where a data extraction algorithm may be installed that may extract the metadata. In another example, the data extraction algorithm may be installed on a remote server(s) 116, 118, and/or 120, where the metadata may be extracted via network(s) 108. A database may be stored on local storage 110, 112, and/or 114, or remote storage device(s) 116, 118, and/or 120. Synthesized data files may be loaded into a database loader and may persist the database-ready files across a database.

In some instances, local database(s) 110, 112, and/or 114, and remote data store(s) 116, 118, and/or 120 may be PostgreSQL (aka "postgres") databases, where multiple sources of data mat be stored. Cross-source data synthesis and distribution/correlation analyses may occur within the PostgreSQL database(s), and a data correlation engine may run recursive database functions to associate data fields with similar data attributes based on at least one probability correlation recipe.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
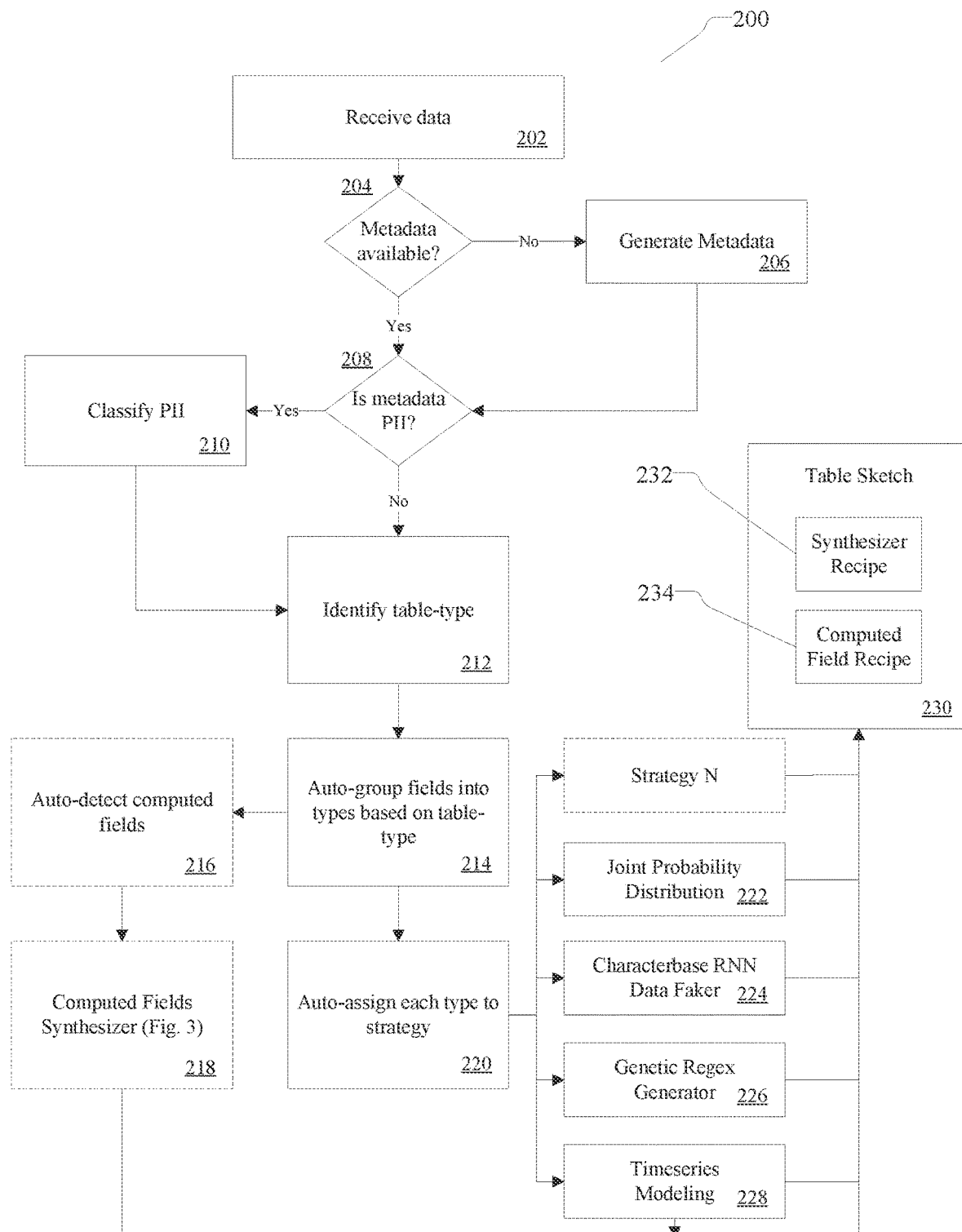
FIG. 2 illustrates an example method for generating synthetic data, as described herein.

FIG. 2 illustrates an example method 200 for generating synthetic data, as described herein. Method 200 begins with step 202, receive data. The data that may be received by the system may be in a variety of formats—data table, data lake, spreadsheet. The data may be organized, disorganized, formatted, unformatted, etc. Once data is ingested in the system, the method 200 proceeds to decision diamond 204, where the system queries whether metadata is available within the dataset. If the metadata already exists in the dataset, then the method proceeds to the next decision diamond at 208. If metadata is unavailable in the ingested data, then metadata may be generated at 206. At step 206, each data field may be examined to determine a field type (e.g., numeric, text, etc.), the count of unique values may be recorded, and the percent of unique values compared to the total values may be recorded. From this information, metadata may be generated at step 206. For example, each field of data may have the following metadata fields: Data Type, Row Count, and Number of Distinct Values. This metadata information may be generated, or if the metadata is already generated, step 206 may be optional in some examples.

At least one ML algorithm may be applied to the dataset to discern which data fields may trigger PII. The ML algorithm may be equipped with at least one natural-language processor that may analyze at least one header row in a data table or spreadsheet to determine if certain headers indicate the presence of PII. For example, a header title of "First Name" or "Birthdate" may indicate that the column of data is PII. As such, metadata may be appended to those data entries, indicating that those data entries include PII.

Once metadata is generated, the method may then move to decision diamond 208, where the system decides whether to detect PII data "yes" or "no." If "yes," an automatic data classification solution (e.g., U.S. Pat. No. 11,138,477) may be used to identify columns which contain PII data in step 210. An example classification may be a "Name" classification where certain data fields of "First Name" and "Last Name" may be classified as a Name domain. Another example may be a "demographic" classification, which may include data fields such as "age," "gender," "ethnicity," "education level," "annual income," etc. Such demographic classifiers may be useful in determining how the data will be synthesized. For fields containing PII, a Characterbase RNN Data Faker 224 and/or a Generic Regex Generator 226 strategy may be applied, which may ensure none of the synthetic data values in the columns overlap with the real, underlying data.

Once the PII is classified at step 210, the data table type is identified automatically in step 212. A table type may be a master, transactional, and/or timeseries type, among other table types. For example, in master data, uniqueness of records is important (each customer is represented by one unique record), while in transactional data, duplication of data in certain fields is the normal (one particular customer will have many transactions). In a timeseries, on the other hand, we track one or more variables over a fixed period of time (e.g., monthly revenue of the company for the past 5 years). Identifying the table type may allow for generation of synthetic data that mimics the correct table type.

After the table type is identified in step 212, the data fields may be auto-grouped into different types based on the table type identified in step 212. Different types may include PII, categorical, unique, continuous, time periods, etc. For example, a data field indicating salary would be a continuous data type, since the value of a salary could be any numerical value. A data field indicating ethnicity could be categorical, as a discrete set of options may be available for selection.

After the data fields are auto-grouped into type based on table-type, the system may automatically assign each type to a specific strategy at step 214. Different strategies may comprise, but are not limited to, joint probability distribution 222, characterbase RNN data faker 224, genetic regex generator 226, and timeseries modeling 228. Which strategy is selected may be determined by the type of file and type of field. For example, types of files may comprise timeseries, master, and/or transactional, among other file types. Types of fields may comprise PII, unique, categorial, numeric, and/or time period, among other types of fields. In one embodiment, the type of file and field may be Master PII and/or Master Unique. This file/field type combination may be assigned the strategies of genetic regex generator 226 or characterbase RNN data faker 224. In another embodiment, the type of file/field may be Master Time Period and/or Master Numeric. These data fields may be grouped into buckets and transformed into the file/field type of Master Categorical, wherein a joint probability distribution 222 strategy may be applied. In yet another embodiment, a timeseries time period and/or timeseries numeric file/field type may be assigned a timeseries modeling strategy 228.

The joint probability distribution strategy 222 functions as follows: given two random variables that are defined on the same probability space, the joint probability distribution is the corresponding probability distribution on all possible pairs of outputs. For example, consider the following table:

|   | A | B |
|---|---|---|
| 0 | 1 | −1 |
| 1 | 1 | −1 |
| 2 | 2 | −2 |
| 3 | 2 | −2 |
| 4 | 2 | −2 |

Based on the above table, the joint probability distribution of A and B is:

| A | B | Prob |
|---|---|------|
| 1 | −1 | 0.4 |

| A | B | Prob |
|---|---|------|
| 2 | −2 | 0.6 |

In the context of generating synthetic data, a combination (1,−1) may be sampled approximately 40% of the time, while a combination (2,−2) may be sampled approximately 60% of the time, ensuring that the correlation between these two fields (A and B) are maintained within the synthetic data.

The characterbase recursive neural network (RNN) data faker 224 functions by intelligently learning to generate fake data based on real data. For example, consider the following names of dinosaur names:

| | Name |
|---|---|
| 0 | Aachenosaurus |
| 1 | Aardonyx |
| 2 | Abdallahsaurus |
| 3 | Abelisaurus |
| 4 | Abrictosaurus |

Using a recurring neural net, a character model may learn what is the likelihood of the next character in a chain. The resulting data created by the RNN model may mimic the real data through learned patterns. For instance, the following fake dinosaur names may be generated based on the input of the above dinosaur names:

| | Name |
|---|---|
| 0 | Gucesauros |
| 1 | Matkrionuansauryphenysa |
| 2 | Prchodon |
| 3 | Strnosaurus |
| 4 | Bangosauras |

The genetic regex generator 226 may function by identifying certain regex matches. For example, if an email address was initially: joe.smith@email.com, then applying a certain regex generator 226 may result in an output of anm.qztiv@email.com, which is a synthetic email address that matches the same character length and character type as the actual email address.

The timeseries modeling strategy 228 uses a series of data points indexed (listed or graphed) in time order. Usually, a time series is a sequence taken at successive equally spaced points in time (e.g., a sequence of discrete-time data). For instance, the system may ingest the real data regarding monthly passengers for a train. When synthesizing the timeseries data, the system may capture the general trend, month over month, of the data, as well as consider how the monthly passenger volume fluctuates during seasons and holidays. Based on the general trend, synthetic data may be generated that mimics the general trend of monthly passengers without actually using the real monthly passenger data.

In one example, salary information may be identified as PII. Because salary information is a continuous field, the system may group the salary values into buckets or ranges (e.g., A to B, B to C, C to D, etc.). To generate synthesized data for this type of PII, the system may elect to expand the salary ranges or narrow the salary ranges. If the system expands the salary ranges, a trade-off may occur, as the user may derive less accurate distribution and/or correlation data as compared to the original dataset, but the risk of a privacy breach is much lower. If the system narrows the salary ranges, the user may derive more accurate distribution and/or correlation data as compared to the original dataset, but the risk of a privacy breach is higher, since the data is more granular. The closer a user may be to the real, underlying data, the higher the risk of breaching privacy of synthetic PII.

Figure 3:
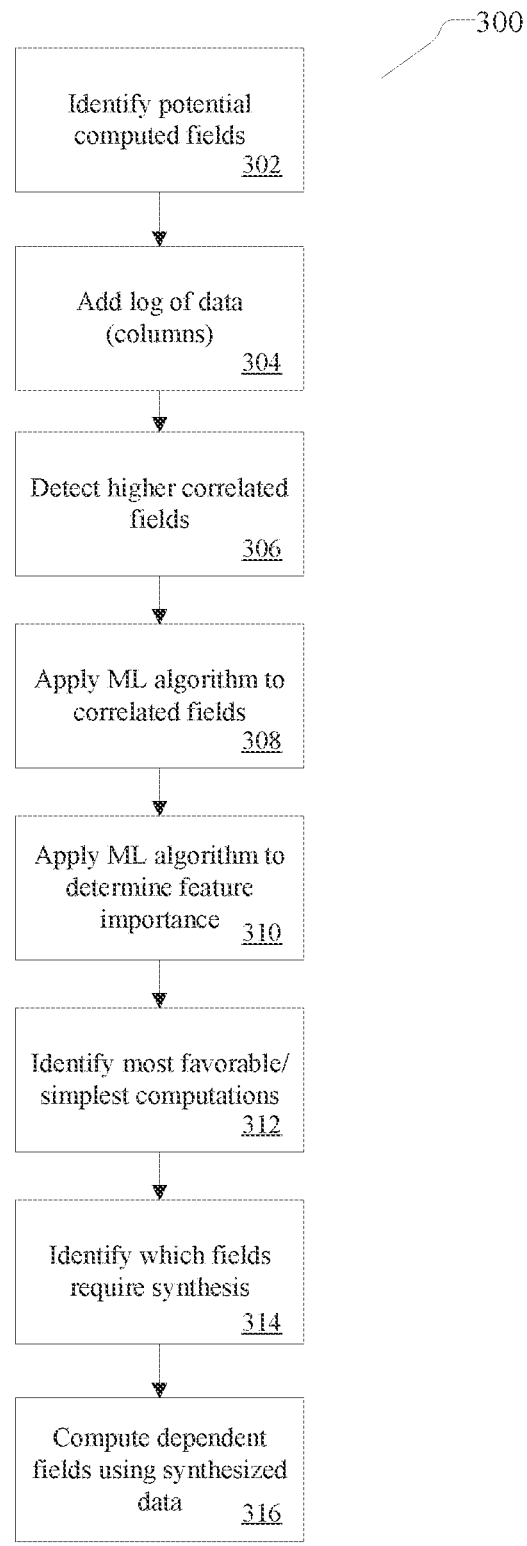
FIG. 3 illustrates an example method for auto-generating computed fields.

After all applicable strategies are applied as well as the auto-detect computed fields method of FIG. 3, then a table sketch may be generated at step 230, where a synthesizer recipe 232 may be generated based on the table sketch, as well as a computed field recipe 234, which may be generated based on a computed fields synthesizer, which is further described in FIG. 3. The synthesizer recipe 232 and computed fields recipe 234 may be saved into a table sketch so that each time a synthetic data set is requested based on the same, underlying real data, the recipes do not need to be regenerated. The recipes, instead, can be recycled for subsequent requests. Further, the recipes may be used in a query instead of querying the entire, underlying dataset, which may increase efficiency and memory use of data analysis requests.

After data fields are automatically grouped into types based on table-type at step 214, some data fields may be automatically detected as computed fields in step 216. For example, the system may determine that a certain data field has a dependency on another data field. This may be shown explicitly in a function (f(x)) within a spreadsheet or a data table. The fields that are detected as computed fields in step 216 may then be analyzed by the computed fields synthesizer at step 218, which is further described with respect to FIG. 3.

FIG. 3 illustrates an example method for auto-generating computed fields. Method 300 begins with identifying potential computed fields from the dataset at step 302. The identified computed fields may be data fields that have explicit dependencies on other fields via the inclusion of a formula that comprises a data value from somewhere else in the dataset, for example. After the potential computed fields are identified at step 302, the log of each numeric data (columns) may be added together at step 304. By computing logs for each column, multiplication and division relationships may be detected. In step 306, fields that have a higher correlation to other fields may be detected, e.g., using a pairwise correlation coefficient. This step 306 may limit the subset of likely computations to try. In step 308, a machine learning algorithm (e.g., linear regression) may be applied to the correlated fields to identify if any of the fields may be predicted by either adding or subtracting the data values (or log of the data values). In step 310, a second pass of the ML algorithm may occur in order to determine feature importance. Specifically, a linear regression algorithm may be used to model a relationship between a dependent and independent variable, which has the form of $Y=a+b1\times1+\ldots+bnXn+c$. The ouptut of step 310 may be a computation matrix. In step 312, an algorithm that identifies the most favorable/simplest calculations (i.e., involving fewest number of fields) may be applied to the fields. In step 314, an algorithm to establish which fields need to be provided (and, thus, synthesized) may be applied to the data fields. Step 314 may also determine the order in which the calculations may occur. Finally, in step 316, the computation calculations may be performed after the independent variables have been synthesized.

A graph data structure may be used to manage and track relationships among different fields. Each numeric field may be considered a node in the graph. If a field can be computed from one or more other data fields, directed edges may be added from those fields to the target field (i.e., a node's incoming edges may indicate which fields are required to compute the target field). To add a computation to the graph may involve adding the directed edges. Other quality assurance measure may be implemented, such as cyclic redundancy checks and exclusion of target fields that are already the target of another computation.

The method for computing fields may include attempting to identify the simplest computations that involve 2 fields, e.g., A=B+1, A=2*B, etc., and progress to identifying computations involving 3+ fields (if needed). When checking for computations with 3+ fields, the system may consider the log value of the fields so that calculations involving multiplication and division may be detected. Various approximations may be applied, such as filtering candidate fields by correlation coefficient. For instance, computations with unreasonably large or small coefficients or intercepts may be excluded because they may indicate a coincidental relationship.

In some examples, after step 306, a graph structure may be initialized where each field may be considered a node. Then, detection of simple computations that involve 2 fields may occur. Pairs of fields that are perfectly correlated (correlation coefficient of approximately "1") may be identified. For each correlated pair of fields, a linear regression model may be trained to determine coefficient and intercept values for the relationship. If the target field (i.e., dependent variable) is not already the target of another computation (i.e., no incoming edges in a graph), the computation is added to the graph and the formula may be stored.

After the 2-field computations have been added, the system may then proceed to detect computations with 3 or more fields. For fields that are not already targets of an existing computation, a linear regression model may be trained to determine whether the prospective target fields can be predicted from the other fields. Feature importance values may be generated for the independent variables based on the linear regression model. In the detection of addition/subtraction (non-log values), fields that were targets in a 2-field computation may be excluded as independent variables. For example in the computation A=2*B, the values of A or B can provide equivalent information regarding the computation, so only one value needs to be included.

For target fields that can be predicted, prioritized combinations of independent variables using feature importance values from previous steps may be generated. For example, if independent variables A, B, and C are listed in order of decreasing importance, the system may try a computation on (A, B) first and then (A, B, C). A linear regression model may be further trained that moves progressively through the prioritized groupings of each independent variable. For instance, if the linear regression model outputs a threshold score of −1, the system may attempt to add a computation to the graph and store a formula. If the linear regression model outputs a score below the threshold, the system may move to the next grouping of independent variables in the prioritized list and then repeat the process until all identified independent variables for computation have been analyzed.

In one example, a computed qraphs field may be as follows:

Amount1 + Amount2 = Addition
Amount1 − Amount2 = Subtraction

-continued

Amount1 × Amount2 = Multiplication
Amount1/Amount2 = Division

Based on this graph, the dataset of 6 fields can be reproduced if, for example, Amount1 and Amount2 are provided, since Addition, Subtraction, Multiplication, and Division can all be calculated using Amount1 and Amount2. Equally, if Addition and Subtraction are provided, Amount1 and Amount2 may be computed from Addition and Subtraction, and Amount1 can then be used with Amount2 to compute Multiplication and Division. In the context of generating synthetic data for this dataset, only two out of the six fields need to be synthesized, as the remaining fields may always be computed from the two synthesized fields.

Figure 4:
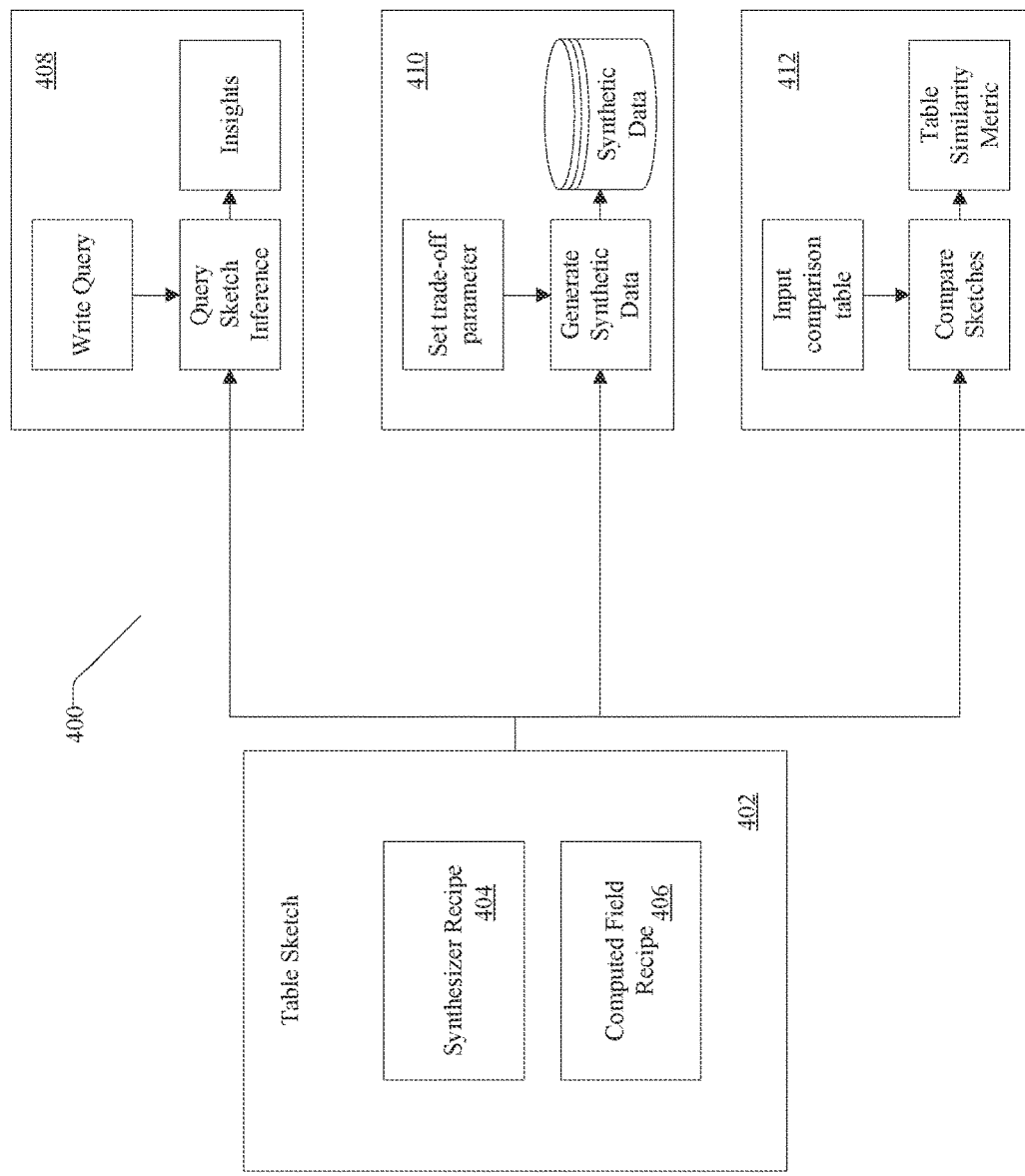
FIG. 4 illustrates examples of table sketch applications using a Synthesizer Recipe and Computed Field Recipe.

FIG. 4 illustrates examples of table sketch applications using a Synthesizer Recipe and Computed Field Recipe. FIG. 4 shows an example method 400 with three different application examples of how the table sketch 402 may be used. In one example, a query sketch inference may be generated in 408. A user may query the table sketch 402, and based on the query, a synthesizer recipe 404 and/or computed field recipe 406 may be applied to provide the user a deterministic and/or probabilistic snapshot of the data. For example, a user may query the probability that a random male in New York is making above a certain salary threshold. Rather than analyzing every data point in the dataset, the system may query a recipe within the table sketch and produce a near accurate result to the user.

In another example, additional synthetic data may be generated in 410, where a trade-off parameter may be received by the user. The trade-off parameter may indicate how close the user wants to be to the underlying, actual data. The closer the user is to the underlying data, the higher the risk of an inadvertent privacy breach. As such, the trade-off parameter may be programmatically contained to ensure that certain trade-off thresholds are not breached. In some scenarios, the trade-off parameter may be a numerical value between 1 and 10, where 10 is the actual, underlying data, and 1 is the furthest synthesis of that data while still maintaining statistically significant accuracy as to probability distribution and correlation metrics. The system may only allow a user to select an "8" trade-off parameter as the highest value in order to ensure that PII privacy is maintained.

In yet another example, data tables may be compared at step 412 where a table may be input and the table sketches of each table may be compared. A table similarity metric may be generated showing the similarities and differences of each table, such as the degree of overlap or duplicate data, as well as data fields that may be present in one table but not the other. In one instance, a Kullback-Leibier (KL) divergence may be calculated between the two tables to measure how one probability distribution in one table is different from the other table.

Figure 5:
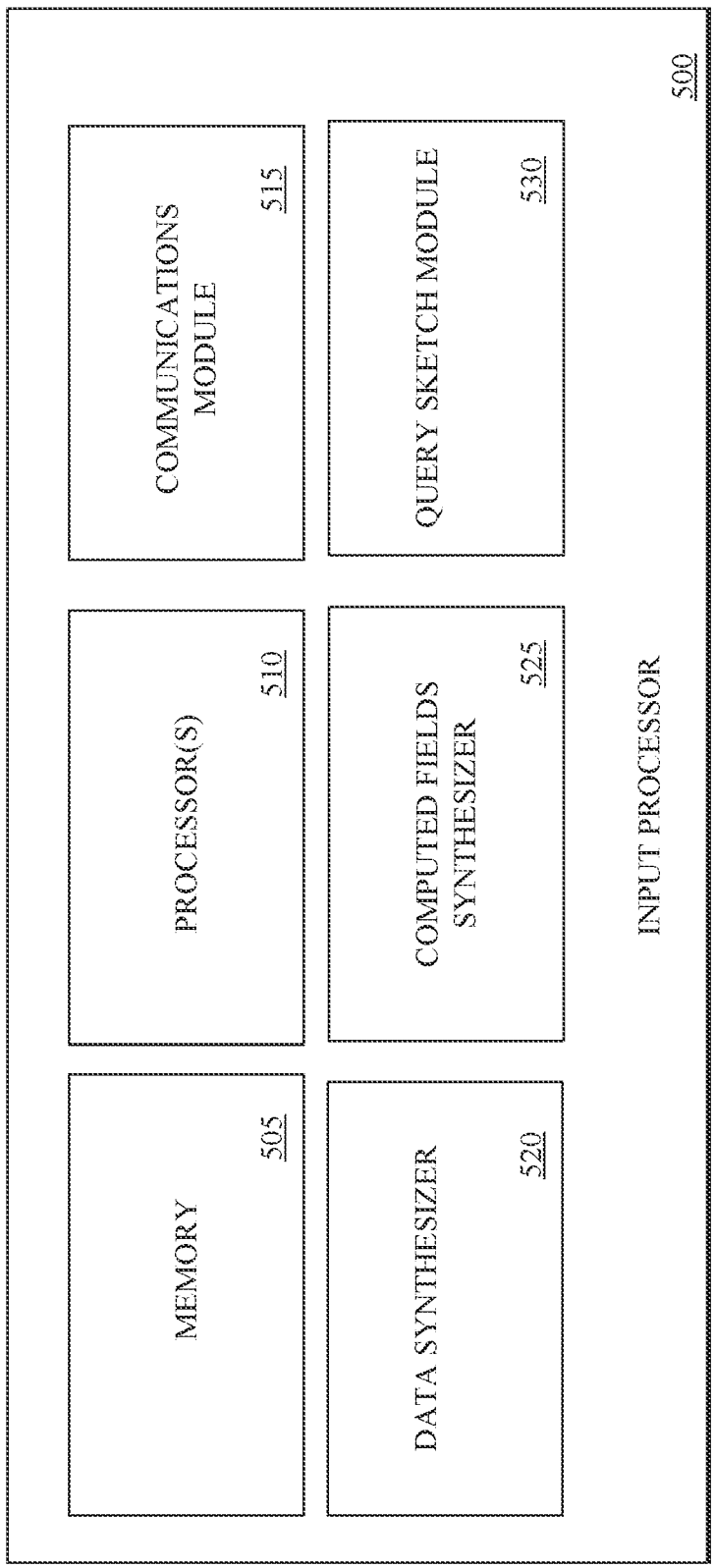
FIG. 5 illustrates an example input processor for implementing systems and methods for generating synthetic data, as described herein.

FIG. 5 illustrates an example input processor for implementing systems and methods for generating synthetic data, as described herein. Input processor 500 may be embedded within a client device (e.g., client devices 102, 104, and/or 106), remote web server device (e.g., devices 116, 118, and/or 120), and other devices capable of implementing systems and methods for generating synthetic data. The input processing system contains one or more data processors and is capable of executing algorithms, software routines, and/or instructions based on processing data provided by at least one client source and/or third-party source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 5, the disclosed system can include memory 505, one or more processors 510, communications module 515, data synthesizer 520, computed fields synthesizer 525, and query sketch module 530. Data synthesizer 520 may be configured to receive PII and synthesize the PII while maintaining accurate probability distribution and correlation metrics of the larger dataset as a whole. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 505 can store instructions for running one or more applications or modules on processor(s) 510. For example, memory 505 could be used in one or more embodiments to house all or some of the instructions needed to execute the functionality of data synthesizer 520, computed fields synthesizer 525, and/or query sketch module 530. Generally, memory 505 can include any device, mechanism, or populated data structure used for storing information. In accordance with some embodiments of the present disclosures, memory 505 can encompass, but is not limited to, any type of volatile memory, nonvolatile memory, and dynamic memory. For example, memory 505 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Communications module 515 is associated with sending/receiving information (e.g., data synthesized by data synthesizer 520, data fields computed by computed fields synthesizer 525, and/or queries received by query sketch module 530), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 515 sends information output by data synthesizer 520 and/or computed fields synthesizer 525 (e.g., synthesized PII values and/or synthesized computed data fields) to client devices 102, 104, and/or 106, as well as memory 505 to be stored for future use. In some examples, communications modules may be constructed on the HTTP protocol through a secure REST server(s) using RESTful services.

Data synthesizer 520 may be configured to receive data from memory 505 and/or communications module 515 (e.g., via network(s) 108 in FIG. 1). Data synthesizer may ingest data and identify certain data fields (e.g., via metadata included in the data fields) as containing PII. If a data field contains PII, the data synthesizer 520 may synthesize the data (i.e., generate fake data that is still accurate in terms of probability distribution/correlation).

Computed fields synthesizer 525 may be configured to receive data from memory 505 and communications module 515. The computed fields synthesizer 525 may identify certain data fields that are dependent on other data fields for generating values. If these computed fields include PII or rely on PII in other data fields, then the computed fields synthesizer 525 may synthesize those computed data fields, while still maintaining the probability distribution and correlation accuracy of the dataset as a whole.

In one example, if a user wanted to identify the Net Pay value of a dataset, net pay would be found by subtracting Tax Amount from Gross Pay. As such, in this simple example, only Gross Pay and Tax Amount would need to be synthesized, as Net Pay would be calculated from the synthesized Gross Pay and Tax Amount and maintain the same numerical relationships as the real, underlying data. For clarity, Net Pay would be a computed field that is not synthesized but rather derived from two synthesized fields: Gross Pay and Tax Amount.

Query sketch module 530 may be configured to receive certain synthesized data and data recipes from data synthesizer 520 and computed fields synthesizer 525. The query sketch module 520 may also be configured to receive queries via communications module 515. The queries may be analyzed by query sketch module 530, which may intelligently select certain recipes from a table sketch based on the data that is being queried.

Figure 6:
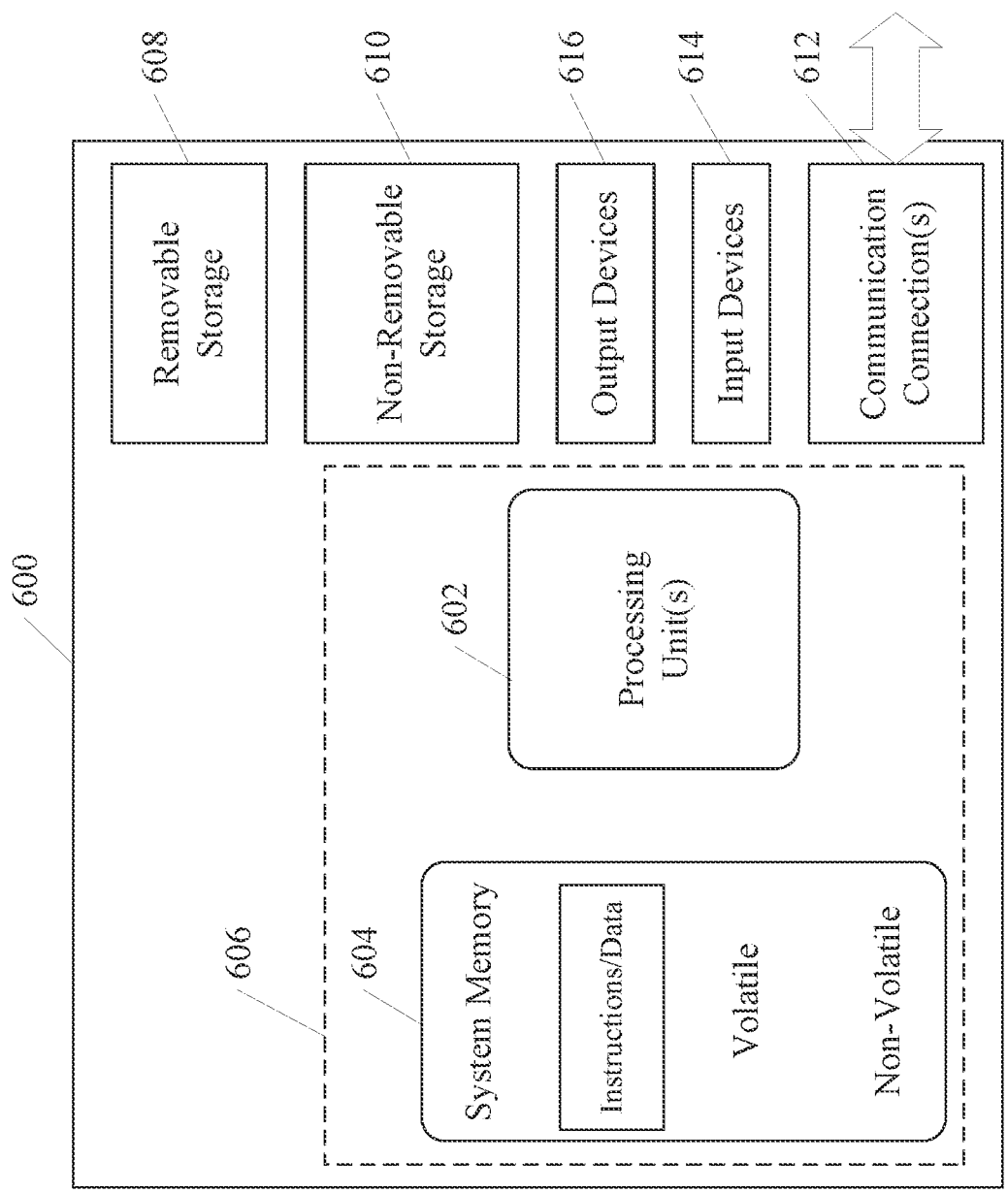
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for generating synthetic data, comprising:
  a memory configured to store non-transitory computer readable instructions; and
  a processor communicatively coupled to the memory, wherein the processor, when executing the non-transitory computer readable instructions, is configured to:
    receive at least one dataset;
    analyze the at least one dataset for metadata;
    if the at least one dataset does not comprise metadata, generate metadata, wherein the generated metadata identifies at least one data field as comprising personally identifiable information (PII);
    identify a table type associated with the at least one data field comprising PII;
    group the at least one data field comprising PII into a data type based on the identified table type;
    apply at least one data analysis strategy to the at least one data field comprising PII, wherein the at least one data analysis strategy synthesizes the at least one data field comprising PII;
    generate at least one synthesized data field based on the at least one data field comprising PII, wherein the at least one synthesized data field does not comprise PII, and wherein the at least one synthesized data field correlates to the at least one data field comprising PII; and
    based on the at least one synthesized data field, generate at least one table sketch, wherein the table sketch comprises at least one synthesizer recipe and at least one computed field recipe.

2. The system of claim 1, the processor further configured to:
  divide the at least one data field comprising PII into a plurality of groups based on a percentage of unique values appearing in at least one column.

3. The system of claim 2, wherein the plurality of groups comprises at least one of:
  unique, mostly unique, and mostly not unique.

4. The system of claim 1, the processor further configured to:
  assign at least one numeric bucket to the at least one data field comprising PII.

5. The system of claim 4, wherein the at least one data field comprising PII is identified as mostly unique.

6. The system of claim 1, the processor further configured to:
  apply a joint probability distribution to the at least one data field comprising PII.

7. The system of claim 6, the processor further configured to:
  generate the at least one synthesized data field based on the joint probability distribution of the at least one data field comprising PII.

8. The system of claim 7, wherein the joint probability distribution of the at least one synthesized data field correlates to the joint probability distribution of the at least one data field comprising PII.

9. The system of claim 1, wherein the table type is at least one of: a timeseries table, a transactional table, and a master table.

10. The system of claim 1, wherein the data type is at least one of: a PII type, a unique type, a categorical type, a numeric type, and a time period type.

11. The system of claim 1, wherein the at least one data analysis strategy is at least one of: a joint probability distribution, a characterbase RNN data faker, a genetic regex generator, and a timeseries model.

12. A method for generating synthetic data, comprising:
receiving at least one dataset, wherein the at least one dataset comprises metadata;
analyzing the metadata of the at least one dataset for PII;
classifying the PII;
based on the classification of the PII, identifying a table type associated with the PII;
grouping the PII into a data type based on the identified table type;
auto-detecting at least one computed field among the PII;
synthesizing at least one independent field based on the at least one computed field;
identifying at least one dependent field, wherein the at least one dependent field depends on the at least one independent field;
generating at least one computed field recipe, wherein the at least one computed field recipe comprises computing the at least one dependent field using the at least one synthesized independent field; and
storing the at least one computed field recipe.

13. The method of claim 12, wherein auto-detecting at least one computed field among the PII further comprises adding a log of at least one column of PII.

14. The method of claim 12, wherein auto-detecting at least one computed field among the PII further comprises detecting at least one pair of correlated fields.

15. The method of claim 14, further comprising applying at least one machine-learning algorithm to the at least pair of correlated fields.

16. The method of claim 15, wherein the at least one machine-learning algorithm is a linear regression.

17. The method of claim 15, further comprising determining a feature importance of the at least one pair of correlated fields using the linear regression.

18. The method of claim 12, wherein auto-detecting at least one computed field among the PII further comprises identifying a plurality of fields with two or less variables.

19. The method of claim 12, wherein auto-detecting at least one computed field among the PII further comprises identifying a plurality of fields with three or more variables.

20. A computer-readable media storing non-transitory computer executable instructions that when executed cause a computing system to perform the steps for generating synthetic data, comprising:
receiving at least one dataset, wherein the at least one dataset comprises metadata;
analyzing the metadata of the at least one dataset for PII;
classifying the PII;
based on the classification of the PII, identifying a table type associated with the PII;
grouping the PII into a data type based on the identified table type;
auto-detecting at least one computed field among the PII;
assigning at least one data analysis strategy type to the at least one computed field based on the table type associated with the PII;
generating at least one synthesizer recipe for the at least one computed field;
applying the at least one synthesizer recipe to the at least one independent field based on the at least one computed field, wherein the at least one computed field is a dependent variable that depends on the at least one independent field;
generating at least one computed field recipe, wherein the at least one computed field recipe comprises computing the at least one computed field using the at least one synthesized independent field;
storing the at least one computed field recipe; and
storing the at least one synthesizer recipe in a table sketch.

* * * * *